US012809207B2

(12) United States Patent
Huang et al.

(10) Patent No.: US 12,809,207 B2
(45) Date of Patent: Nov. 24, 2026

(54) DISPLAY DEVICE AND CONTROL METHOD FOR CONTROLLING SAME

(71) Applicant: BOE Technology Group Co., Ltd., Beijing (CN)

(72) Inventors: Haitao Huang, Beijing (CN); Na Han, Beijing (CN); Lili Chen, Beijing (CN); Ruijun Dong, Beijing (CN); Hao Zhang, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 50 days.

(21) Appl. No.: 18/705,926

(22) PCT Filed: Apr. 28, 2023

(86) PCT No.: PCT/CN2023/091452
§ 371 (c)(1),
(2) Date: Apr. 29, 2024

(87) PCT Pub. No.: WO2023/231672
PCT Pub. Date: Dec. 7, 2023

(65) Prior Publication Data

US 2026/0140413 A1 May 21, 2026

(30) Foreign Application Priority Data

May 30, 2022 (CN) ......................... 202210602212.1

(51) Int. Cl.
*G02F 1/1335* (2006.01)
*G02F 1/13363* (2006.01)

(52) U.S. Cl.
CPC .. *G02F 1/133526* (2013.01); *G02F 1/133536* (2013.01); *G02F 1/133638* (2021.01)

(58) Field of Classification Search
CPC .. G02B 3/0006; G02B 3/0037; G02B 3/0043; G02B 5/3083; G02B 1/041;
(Continued)

(56) References Cited

U.S. PATENT DOCUMENTS 5,731,857 A 3/1998 Neijzen
2018/0039052 A1* 2/2018 Khan ................ G02B 17/0856
(Continued)

FOREIGN PATENT DOCUMENTS

CN 108139591 A 6/2018
CN 112054131 A 12/2020
(Continued)

OTHER PUBLICATIONS

CN202210602212.1 Notification to grant patent right for invention dated Jul. 16, 2023.

*Primary Examiner* — Jia X Pan
(74) *Attorney, Agent, or Firm* — IPro, PLLC

(57) ABSTRACT

A display device is provided. The display device includes a display panel, a micro-lens assembly, and a lens assembly; wherein the micro-lens assembly comprises at least three micro-lens arrays; wherein orthographic projections of the at least three micro-lens arrays on a display region of the display panel are arranged sequentially in a direction away from a center of the display region, and the micro-lens array is configured to decrease a light exit angle of a light beam traveling through the micro-lens array, to make the light exit angle of the light beam traveling through the micro-lens array less than or equal to the maximum value of the corresponding light exit angle.

19 Claims, 6 Drawing Sheets

(58) Field of Classification Search
CPC ... G02B 3/0012; G02B 3/00; G02F 1/133526; G02F 1/133536; G02F 1/13363; G02F 1/133638; H10K 59/879; B29D 11/00365; B29D 11/00298; H01L 27/14627
See application file for complete search history.

(56) References Cited

U.S. PATENT DOCUMENTS

| | | | | |
|---|---|---|---|---|
| 2018/0101020 | A1* | 4/2018 | Gollier ................. | G02B 27/022 |
| 2020/0373460 | A1 | 11/2020 | Hsu et al. | |
| 2022/0209197 | A1* | 6/2022 | Luo ...................... | H10K 59/121 |

FOREIGN PATENT DOCUMENTS

| | | | | |
|---|---|---|---|---|
| CN | 212111977 | U | | 12/2020 |
| CN | 112652728 | A | | 4/2021 |
| CN | 112859347 | A | | 5/2021 |
| CN | 113471259 | A | | 10/2021 |
| CN | 113485012 | A | | 10/2021 |
| CN | 113692547 | A | | 11/2021 |
| CN | 114280793 | A | * | 4/2022 |
| CN | 114967214 | A | | 8/2022 |
| JP | 2000305171 | A | | 11/2000 |

* cited by examiner

DISPLAY DEVICE AND CONTROL METHOD FOR CONTROLLING SAME

CROSS-REFERENCE TO RELATED APPLICATION

This application is a U.S. national stage of international application No. PCT/CN2023/091452, filed on Apr. 28, 2023, which claims priority to Chinese patent application No. 202210602212.1, filed on May 30, 2022, and entitled “DISPLAY APPARATUS AND CONTROL METHOD OF DISPLAY APPARATUS,” the disclosures of which are herein incorporated by reference in their entireties.

TECHNICAL FIELD

The present disclosure relates to the field of display technology, and in particular, to a display device and a method for controlling the same.

BACKGROUND

A display device is a device capable of achieving a display function.

SUMMARY

Embodiments of the present disclosure provide a display device and a method for controlling the same. The technical solutions are as follows.

According to some embodiments of the present disclosure, a display device is provided. The display device includes: a display panel, a micro-lens assembly, and a lens assembly: wherein the display panel has a light-exiting surface and a back surface that are opposite to each other, the micro-lens assembly is disposed at a side, away from the back surface, of the light-exiting surface, and the lens assembly is disposed on a side, away from the display panel, of the micro-lens assembly: wherein the micro-lens assembly includes at least three micro-lens arrays: wherein orthographic projections of the at least three micro-lens arrays on a display region of the display panel are arranged sequentially in a direction away from a center of the display region, each of the at least three micro-lens arrays corresponds to a maximum value of a light exit angle, and the micro-lens array is configured to decrease a light exit angle of a light beam traveling through the micro-lens array, to make the light exit angle of the light beam traveling through the micro-lens array less than or equal to the maximum value of the corresponding light exit angle, the maximum values of the light exit angles corresponding to the at least three micro-lens arrays increasing sequentially in the direction away from the center of the display region; and the at least three micro-lens arrays include a first micro-lens array, a second micro-lens array, and a third micro-lens array;

wherein an orthographic projection of the first micro-lens array on the display region being within a first region of the display region, an orthographic projection of the second micro-lens array on the display region being within a second region of the display region, and an orthographic projection of the third micro-lens array on the display region being within a third region of the display region;

wherein the first region is a region covering the center of the display region, the second region is a region covering a middle position of the display region, and the third region is a region covering an edge of the display region, the middle position being an intermediate position between the center of the display region and the edge of the display region.

In some embodiments, the display region is in a rectangular shape, both the second region and the third region are in a rectangular annular shape, and at least one edge of the second region is parallel to at least one edge of the third region.

In some embodiments, the orthographic projection of the third micro-lens array on the display region is overlapped with the edge of the display region.

In some embodiments, light exit angles of light beams traveling through the at least three micro-lens arrays increase in the direction away from the center of the display region.

In some embodiments, the display region includes a plurality of sub-pixel regions arranged in an array; and the micro-lens array includes a plurality of micro-lenses, wherein a region which an orthographic projection of the micro-lens on the display region is within covers at least one of the sub-pixel regions.

In some embodiments, the region which the orthographic projection of the micro-lens on the display region is within covers at least one pixel region, one pixel region comprising at least three sub-pixel regions.

In some embodiments, an arch height of a micro-lens in the first micro-lens array ranges from 1.5 microns to 2.5 microns, a center distance between two adjacent micro-lenses in the first micro-lens array ranges from 2.5 microns to 3.5 microns, and a refractive index of a material of the micro-lens in the first micro-lens array ranges from 1.47 to 1.67:

an arch height of a micro-lens in the second micro-lens array ranges from 1.4 microns to 2.4 microns, a center distance between two adjacent micro-lenses in the second micro-lens array ranges from 2.5 microns to 3.5 microns, and a refractive index of a material of the micro-lens in the second micro-lens array ranges from 1.47 to 1.67; and an arch height of a micro-lens in the third micro-lens array ranges from 1.2 microns to 2.2 microns, a center distance between two adjacent micro-lenses in the third micro-lens array ranges from 2.5 microns to 3.5 microns, and a refractive index of a material of the micro-lens in the third micro-lens array ranges from 1.47 to 1.67.

In some embodiments, a range of a maximum value of a light exit angle corresponding to the first micro-lens array is [8, 10], a range of a maximum value of a light exit angle corresponding to the second micro-lens array is (10, 14), and a range of a maximum value of a light exit angle corresponding to the third micro-lens array is [14, 16].

In some embodiments, the lens assembly includes a first quarter wave plate, a first lens, a second lens, a second quarter wave plate, and a polarization reflective film that are arranged sequentially in a direction away from the micro-lens array, wherein a semi-transparent and semi-reflective film is disposed on a side, facing towards the first quarter wave plate, of the first lens.

In some embodiments, optical axes of the first quarter wave plate and the second quarter wave plate are perpendicular.

In some embodiments, the display panel includes a substrate, a display structure, and a cover plate that are stacked in sequence:

wherein the micro-lens assembly is a structure formed by a photolithographic process on a side, distal from the display structure, of the cover plate.

In some embodiments, the display panel includes a substrate, a display structure, and a cover plate that are stacked in sequence:

wherein the micro-lens assembly is affixed to a side, distal from the display structure, of the cover plate.

In some embodiments, the display device is a virtual reality display device.

According to some embodiments of the present disclosure, a method for controlling a display device is provided, the method being applicable to the display device, and the method comprising:

acquiring display data; and controlling a display panel in the display device based on the display data to emit light beams, wherein the light beams are directed to at least three micro-lens arrays of a micro-lens assembly in the display device, and light exit angles of transmitted light beams are decreased, by the at least three micro-lens arrays, to be less than or equal to corresponding maximum values of light exit angles, the maximum values of the light exit angles corresponding to the at least three micro-lens arrays successively increasing in a direction away from a center of a display region of the display device;

wherein the at least three micro-lens arrays include a first micro-lens array, a second micro-lens array, and a third micro-lens array, an orthographic projection of the first micro-lens array on the display region being within a first region of the display region, an orthographic projection of the second micro-lens array on the display region being within a second region of the display region, and an orthographic projection of the third micro-lens array on the display region being within a third region of the display region: wherein the first region is a region covering the center of the display region, the second region is a region covering a middle position of the display region, and the third region is a region covering an edge of the display region, the middle position being an intermediate position between the center of the display region and the edge of the display region.

In some embodiments, decreasing the light exit angles of the transmitted light beams by the at least three micro-lens arrays includes:

adjusting, by the first micro-lens array, a range of a maximum value of a light exit angle of a light beam traveling through the first micro-lens array to [8, 10];

adjusting, by the second micro-lens array, a range of a maximum value of a light exit angle of a light beam traveling through the second micro-lens array to (10, 14); and adjusting, by the third micro-lens array, a range of a maximum value of a light exit angle of a light beam traveling through the third micro-lens array to [14, 16].

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person skilled in the art may still derive other drawings from these accompanying drawings without creative efforts.

Some specific embodiments of the present disclosure are shown by means of the above-described accompanying drawings, which are described in detail hereinafter. These accompanying drawings and textual descriptions are not intended to limit, in any way, the scope of the conception of the present disclosure, but rather to illustrate the concepts of the present disclosure for those skilled in the art by reference to particular embodiments.

DETAILED DESCRIPTION

In order to make the purpose, technical solutions, and advantages of the present disclosure clearer, the following further describes the embodiments of the present disclosure in detail in conjunction with the accompanying drawings.

In some embodiments, a display device includes a display panel and a lens assembly. The display panel is configured to emit a light beam containing an image. One surface of the display panel has a display region for displaying an image, the surface having the display region is referred to as a light-exiting surface, and a light beam is emitted from the display region of the light-exiting surface of the display panel, the light beam containing image information.

In some embodiments, the lens assembly is disposed at a side, away from a back surface of the display panel, of the light-exiting surface of the display panel 11 for processing the light beam emitted by the display panel, to facilitate viewing of a user.

Figure 1:
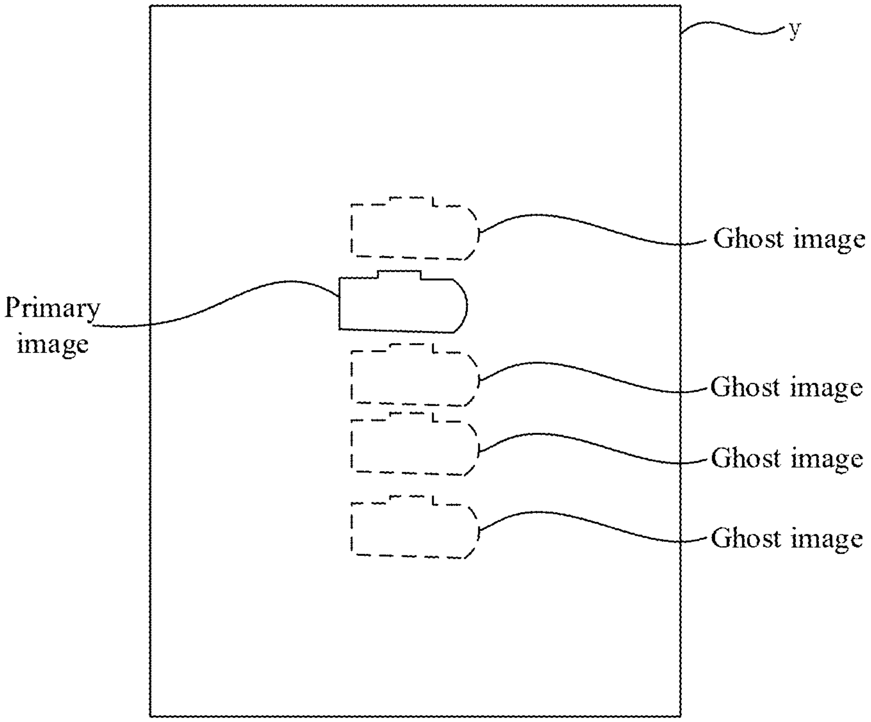
FIG. 1 is a schematic diagram of a display screen of a display device in the related art.

However, it is difficult to control the light exit angle of the light beam emitted by the above-described display panel, which may result in a poor display effect of the light beam projected by the lens assembly. Further, the light beams emitted from various regions of the display panel may have large light exit angles, resulting in the generation of a ghosting phenomenon in the lens assembly caused by the light beams emitted by the display panel. In some embodiments, reference is made to FIG. 1, which is a schematic diagram of a display screen of a display device in the related art, in the display screen y, the primary image is the actual desired image, and the ghost image is the image, generated due to structural reasons, similar to the primary image. It can be seen that the ghost image has a great effect on the display effect, resulting in a poor display effect of the display device.

Figure 2:
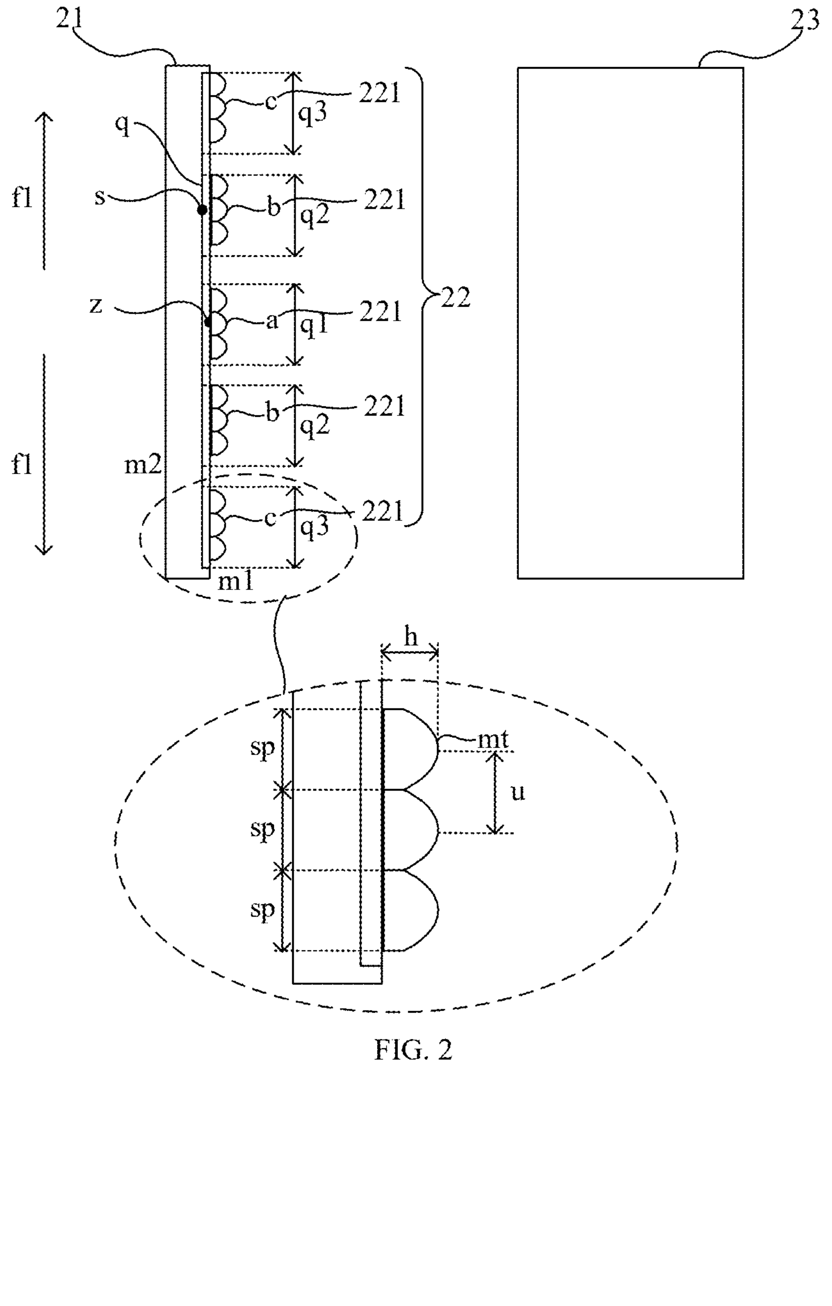
FIG. 2 is a structural schematic diagram of a display device according to some embodiments of the present disclosure.

FIG. 2 is a structural schematic diagram of a display device according to some embodiments of the present disclosure. The display device 20 includes: a display panel 21, a micro-lens assembly 22, and a lens assembly 23.

The display panel 21 has a light-exiting surface m1 and a back surface m2 that are opposite to each other. The micro-lens assembly 22 is disposed at a side, away from the back surface m2, of the light-exiting surface m1 of the display panel 21, and the lens assembly 23 is disposed on a side, away from the display panel 21, of the micro-lens assembly 22.

The micro-lens assembly 22 includes at least three micro-lens arrays 221, orthographic projections of the at least three micro-lens arrays 211 on a display region q of the display panel 21 are sequentially arranged in a direction f1 away from a center z of the display region q. Each of the at least three micro-lens arrays 211 corresponds to a maximum value of a light exit angle, and the micro-lens array 211 is configured to decrease a light exit angle of a light beam traveling through the micro-lens array 211 to be less than or equal to the corresponding maximum value of the light exit angle. The maximum values of the light exit angles corresponding to the at least three micro-lens arrays 211 sequentially increase in the direction f1 away from the center z of the display region.

FIG. 2 illustrates a case in which the number of the micro-lens arrays 221 is 5, but the number of the micro-lens arrays 221 is other in some other embodiments, such as 3, 4, 6, 7, 8, 9, or 10, and the like, which is not limited in the embodiments of the present disclosure.

It is to be noted that in the display device provided by the embodiments of the present disclosure, each micro-lens array includes a plurality of micro-lenses, which are convex lenses for decreasing the light exit angles of the light beams emitted by the display panel to reduce the diverging angles of the light beams emitted from the various regions of the display panel, thereby achieving the effect of controlling the light exit angles of the light beams emitted by the display panel and facilitating the lens assembly adjusting and controlling the light beams.

It is also noted that the direction f1 away from the center z of the display region q includes a plurality of directions radiating from the center z of the display region q to the edge of the display region q and parallel to the light-exiting surface m1. The at least three micro-lens arrays include a first micro-lens array a, a second micro-lens array b, and a third micro-lens array c.

An orthographic projection of the first micro-lens array a on the display region q is within a first region q1 of the display region q, an orthographic projection of the second micro-lens array b on the display region q is within a second region q2 of the display region q, and an orthographic projection of the third micro-lens array c on the display region q is within a third region q3 of the display region q.

The first region q1 is a region covering the center z of the display region q, the second region q2 is a region covering a middle position s of the display region q, and the third region q3 is a region covering an edge of the display region q, wherein the middle position s is an intermediate position between the center z of the display region q and the edge of the display region q. In some embodiments, the middle position is a position whose distances to the center z of the display region q and to the edge of the display region q are equal.

In summary, in the display device provided by the embodiments of the present disclosure, at least three micro-lens arrays are disposed at the side, away from the back surface, of the light-exiting surface of the display panel, and the at least three micro-lens arrays are arranged sequentially in a direction away from the center of the display region to respectively adjust the light exit angles of light beams emitted from a plurality of regions starting from the center of the display region, so as to reduce the light exit angles of the plurality of regions and make maximum light exit angles of the plurality of regions increase in a direction away from the center of the display region. In this way, ranges of light exit angles of the various regions of the display panel can be controlled, thereby solving the problem that the light exit angle of the light beam emitted by the display panel is difficult to control in the related art, which may lead to a poor imaging effect of the light beam projected by the lens assembly, achieving the control for the light exit angle of the light beam emitted by the display panel, and improving the display effect.

Referring to FIG. 2, in some embodiments, the light exit angles of the light beams transmitted through the at least three micro-lens arrays 221 increase in a direction f away from the center z of the display region q1. That is, the farther away from the center z of the display region q1 the light beam transmitted through the micro-lens array 221 is, the larger the light exit angle of the light beam is. Such a structure can further improve the display effect of the display device.

Figure 3:
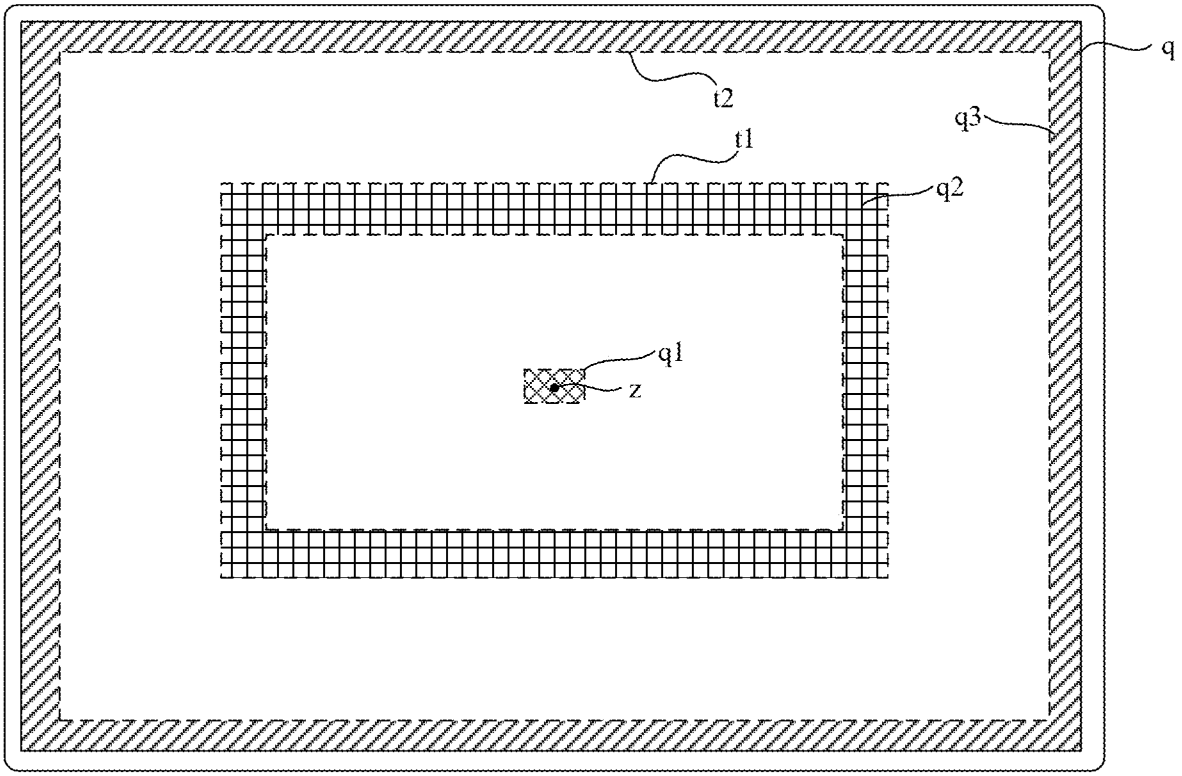
FIG. 3 is a right view of the display panel shown in FIG. 2.

In some embodiments, reference is made to FIG. 3, which is a right view of the display panel shown in FIG. 2, the display region q is in a rectangular shape, both the second region q2 and the third region q3 are in a rectangular annular shape, and at least one edge of the second region q2 is parallel to at least one edge of the third region a3. In some embodiments, as shown in FIG. 3, a first edge t1 of the second region is parallel to a second edge 12 of the third region q3. In such a structure, both the second micro-lens array and the third micro-lens array also are in a rectangular annular shape in some embodiments.

In some embodiments, the orthographic projection of the third micro-lens array on the display region q is overlapped with an edge of the display region q. With such a structure, the third micro-lens array is capable of controlling the light exit angle of the light emitted from the sub-pixel located at the edge of the display region q, so as to avoid the case that the light exit angle of the light beam emitted by this part of the sub-pixels is too large. The light beam emitted by the sub-pixel located at the edge of the display region q may have a large effect on the ghosting phenomenon, but the display device provided by the embodiments of the present disclosure controls the light exit angle of this part of the light beam, thereby reducing the contrast of the ghost image.

In some embodiments, referring to FIG. 2, the display region q includes a plurality of sub-pixel regions sp that are arranged in an array. The micro-lens array includes a plurality of micro-lenses mt, and a region which an orthographic projection of the micro-lens mt on the display region q is within covers at least one sub-pixel region sp. FIG. 2 illustrates a structure in which the region which an orthographic projection of the micro-lens mt on the display region q is within covers one sub-pixel region sp, that is, the micro-lenses mt in the micro-lens array is in one-to-one correspondence with the sub-pixel regions in the display region q. With this structure, one micro-lens is configured to adjust the light exit angle of the light beam emitted by one sub-pixel region, which improves the accuracy of the adjustment for the light exit angle.

The sub-pixel region and the pixel region involved in the embodiments of the present disclosure are described as follows.

Depending on different types of display panels, the display panel includes different structures. In some embodiments, in the case that the display panel is a liquid crystal display panel, the display panel includes an array substrate, a color filter substrate, and a liquid crystal layer disposed between the two substrates, wherein the color filter substrate includes a plurality of color resist layers arranged in an array thereon, the region where each color resist layer is located being a sub-pixel region. In some embodiments, in the case that the display panel is a self-luminous display panel, the display panel includes a substrate and a plurality of light-emitting units arranged in an array on the substrate, wherein the region where each light-emitting unit is located is a sub-pixel region.

In some embodiments, the above sub-pixel region is configured to emit light with one type of color, and the plurality of sub-pixel regions in the display region include a plurality type of sub-pixel regions configured to emit light with different colors, such as a red sub-pixel region configured to emit red light, a green sub-pixel region configured to emit green light, a blue sub-pixel region configured to emit blue light, and the like (and a white sub-pixel region configured to emit white light is also included in some embodiments). The pixel region involved in the embodiments of the present disclosure includes at least three sub-pixel regions, which are, in some embodiments, a red sub-pixel region for emitting red light, a green sub-pixel region for emitting green light, and a blue sub-pixel region for emitting blue light. In this way, the intensities of light beams emitted by the three sub-pixel regions can be adjusted to achieve the display of various colors.

In some embodiments, the first micro-lens array includes three micro-lenses, wherein orthographic projections of the three micro-lenses on the display region cover a pixel region in the center of the display region; and both the second micro-lens array and the third micro-lens array are micro-lens rings formed by a plurality of connected micro-lenses.

Figure 4:
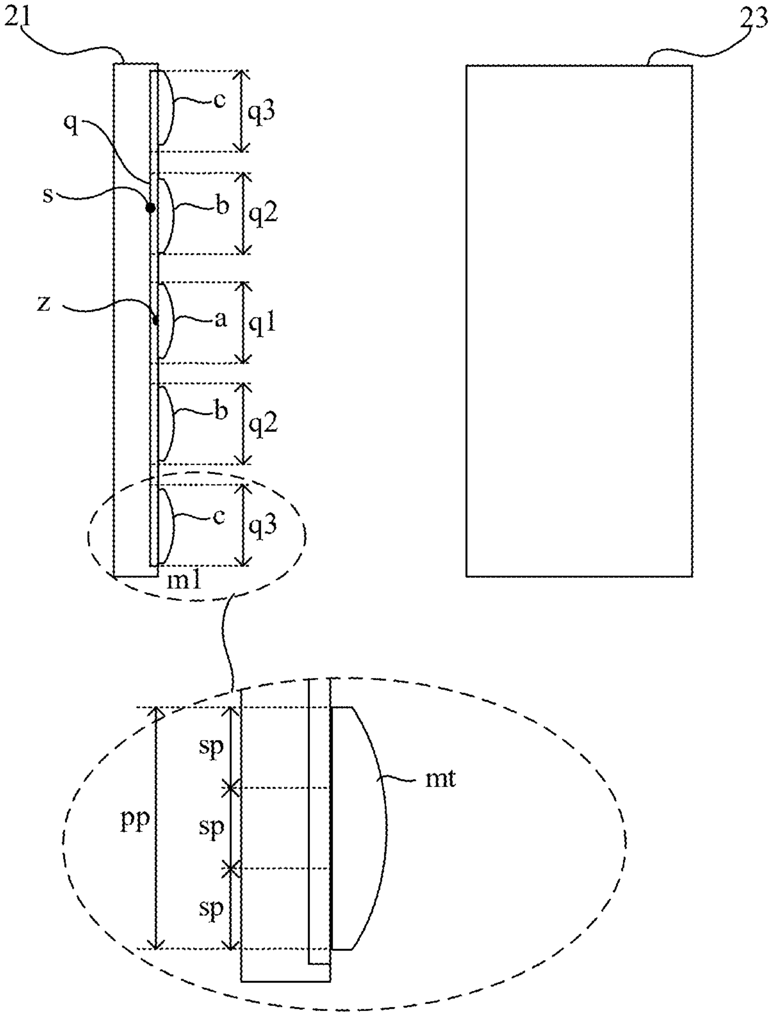
FIG. 4 is a structural schematic diagram of another display device according to some embodiments of the present disclosure.

In some embodiments, reference is made to FIG. 4, which is a structural schematic diagram of another display device according to some embodiments of the present disclosure. The region which the orthographic projection of the micro-lens mt on the display region q is within covers at least one pixel region pp. FIG. 4 illustrates a structure in which the region which the orthographic projection of the micro-lens mt on the display region q is within covers one pixel region pp, i.e., the micro-lenses mt in the micro-lens array are in one-to-one correspondence with the pixel regions pp in the display region q. With such a structure, one micro-lens is configured to adjust the light exit angle of the light beam emitted by one pixel region, therefore, the number of micro-lenses can be reduced, thereby reducing the manufacturing difficulty as well as the manufacturing cost of the display device. In some other embodiments, the region which the orthographic projection of the micro-lens mt on the display region q is within includes more pixel regions pp, such as two, three, four, or more, which is not limited in the embodiments of the present disclosure.

In some embodiments, referring to FIG. 2, an arch height h of the micro-lens mt in the first micro-lens array a ranges from 1.5 microns to 2.5 microns, a center distance u between two adjacent micro-lenses mt in the first micro-lens array a ranges from 2.5 microns to 3.5 microns, and a refractive index of the material of the micro-lens mt in the first micro-lens array a ranges from 1.47 to 1.67. In some embodiments, the arch height h of the micro-lens mt in the first micro-lens array a is 2 microns (μm), the center distance u between two adjacent micro-lenses mt in the first micro-lens array a is 3 microns, and the refractive index of the material of the micro-lens mt in the first micro-lens array a is 1.57.

An arch height h of the micro-lens mt in the second micro-lens array b ranges from 1.4 microns to 2.4 microns, a center distance u between two adjacent micro-lenses mt in the second micro-lens array b ranges from 2.5 microns to 3.5 microns, and a refractive index of the material of the micro-lens mt ranges from 1.47 to 1.67.

In some embodiments, the arch height h of the micro-lens mt in the second micro-lens array b is 1.9 microns, the center distance u between two adjacent micro-lenses mt in the second micro-lens array b is 3 microns, and the refractive index of the material of the micro-lens mt in the second micro-lens array b is 1.57.

An arch height h of the micro-lens mt in the third micro-lens array c ranges from 1.2 microns to 2.2 microns, a center distance u between two adjacent micro-lenses mt in the micro-lens array ranges from 2.5 microns to 3.5 microns, and a refractive index of the material of the micro-lens mt ranges from 1.47 to 1.67.

In some embodiments, the arch height h of the micro-lens mt in the third micro-lens array c is 1.7 microns, the center distance u between two adjacent micro-lenses mt in the third micro-lens array c is 3 microns, and the refractive index of the material of the micro-lens mt in the third micro-lens array c is 1.57.

A schematic diagram of a partially enlarged structure of the third micro-lens array c is illustrated in FIG. 2, and the arch height h of the micro-lens mt and a center distance u in the third micro-lens array c are also illustrated. The structures of the first micro-lens array a and the second micro-lens array b can be seen in reference to the third micro-lens array c, which are not repeated in the embodiments of the present disclosure.

In some embodiments, a range of a maximum value of the light exit angle corresponding to the first micro-lens array a is [8, 10], such as 10 degrees, 8.5 degrees, 9 degrees, or 9.5 degrees, etc., a range of a maximum value of the light exit angle corresponding to the second micro-lens array b is (10, 14), such as 12 degrees, 11 degrees, 11.5 degrees, or 13 degrees, etc., and a range of a maximum value of the light exit angle corresponding to the third micro-lens array c is [14,16], such as 14 degrees, 15.5 degrees, 15 degrees, or 16 degrees, etc. In some embodiments, the light exit angle of the light beam traveling through the first micro-lens array a ranges from −10 degrees to 10 degrees, the light exit angle of the light beam traveling through the second micro-lens array b ranges from −12 degrees to 7 degrees, and the light exit angle of the light beam traveling through the third micro-lens array c ranges from −9 degrees to 14 degrees, wherein in the ranges of the light exit angles corresponding to the second micro-lens array and third micro-lens array, the angle deflecting toward the center of the display region is a positive angle, and the angle deflecting toward the edge of the display region is a negative angle. Within this angle range, the contrast of the ghost image is effectively reduced. It is to be noted that the value of the light exit angle involved in the embodiments of the present disclosure refers to the deviation degree of the direction of the light beam from the normal, and the larger the degree of deviation, the larger the light exit angle of the light beam. However, the value of the light exit angle is not affected by the positive or negative sign, illustratively, the degree of deviation of the angle of −12 degrees from the normal is larger than the degree of deviation of the angle of 7 degrees from the normal, and it can also be understood that when comparing the light exit angle, it is actually comparing the absolute value of the light exit angle.

Figure 5:
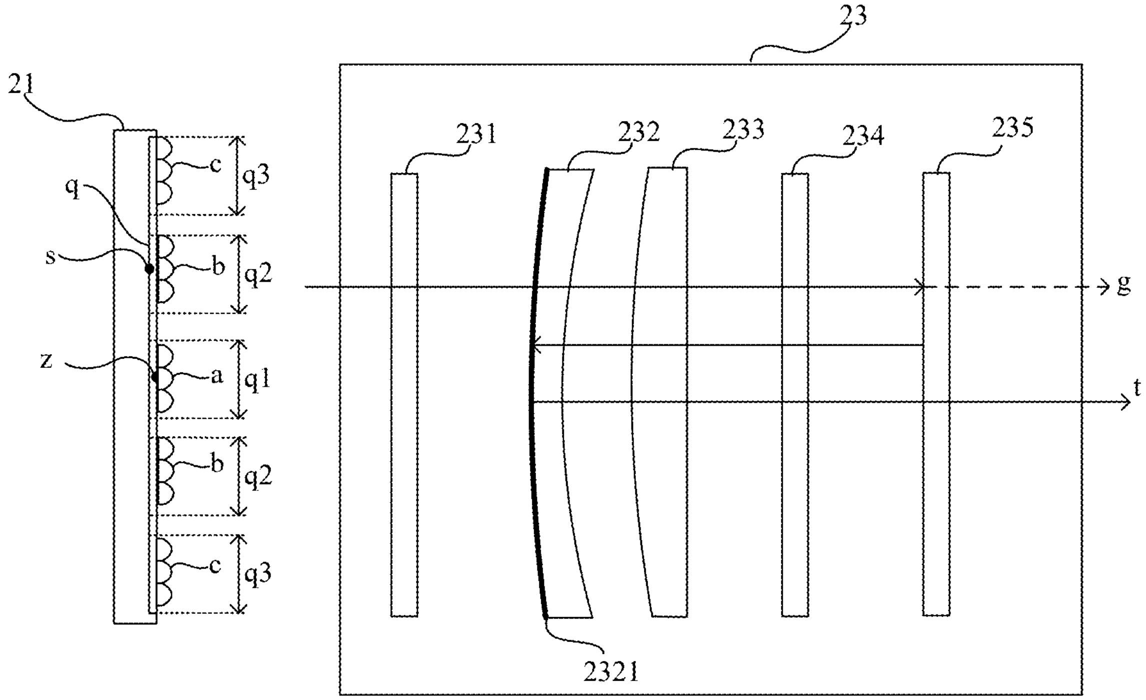
FIG. 5 is a structural schematic diagram of another display device according to some embodiments of the present disclosure.

In some embodiments, reference is made to FIG. 5, which is a structural schematic diagram of another display device according to some embodiments of the present disclosure. The lens assembly 23 includes a first quarter wave plate 231, a first lens 232, a second lens 233, a second quarter wave plate 234, and a polarization reflective film 235 that are sequentially arranged in a direction away from the micro-lens array, wherein a semi-transparent and semi-reflective film 2321 is disposed on the side, facing towards the first quarter wave plate 231, of the first lens 232. Upon emitted by the display panel 21 and traveling through the micro-lens assembly 22, the light beam sequentially travels through the semi-transparent semi-reflective film 2321, the first lens 232, the second lens 233, and the second quarter wave plate 234, then is reflected at the polarization reflective film 235, thereafter sequentially travels through the second quarter wave plate 234, the second lens 233, and the first lens 232, is reflected at the semi-transparent semi-reflective film 2321, then sequentially travels through the first lens 232, the second lens 233, the second quarter wave plate 234, and the polarization reflective film 235, and then is emitted out of the display device. At this time, the light beam t emitted from the display device is a normal image beam, and the human eye can see the image picture based on the light beam. Such a structure is also called a pancake structure (a structure of a virtual reality (VR) device.) The pancake structure has the advantages of good imaging quality and a short total length of the system (≤30 mm).

The display device illustrated in FIG. 5 of the embodiments of the present disclosure, due to the presence of the micro-lens assembly 22, controls the light exit angles of the light beams emitted from a plurality of regions in the display region of the display panel, which in turn reduces the intensity of the light beam that travels through the polarization reflective film 235 upon the light beam being emitted by the display panel 21 and reaching the polarization reflective film 235 for the first time, and thus reduces the contrast of the ghost image.

In some embodiments, the optical axes of the first quarter wave plate 231 and the second quarter wave plate 234 are perpendicular.

Figure 6:
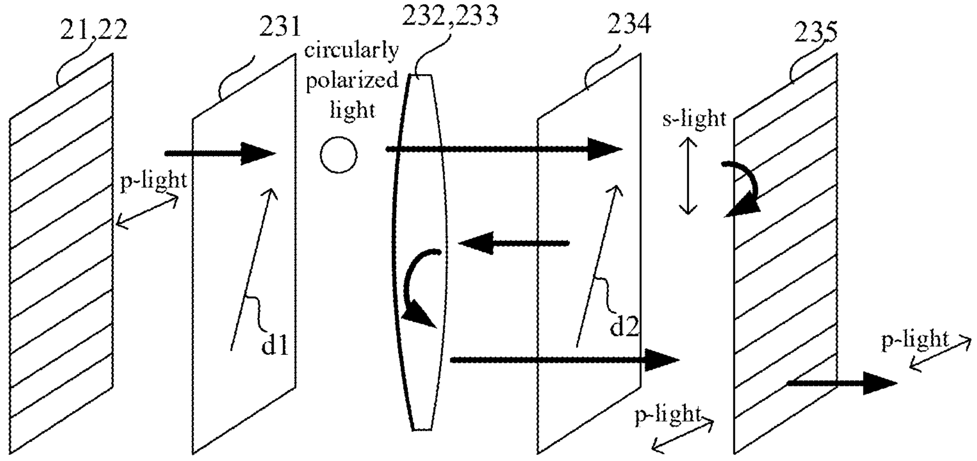
FIG. 6 is a schematic diagram of light corresponding to a display device according to some embodiments of the present disclosure.

Reference is made to FIG. 6, which is a schematic diagram of light corresponding to a display device provided by the embodiments of the present disclosure, wherein the thicker arrows represent the direction of the light path. For the specific light path, reference is made to the corresponding illustration of FIG. 5.

Therein, the optical axes d1 and d2 of the two quarter wave plates 231 and 234 are parallel. The matrix w of one quarter wave plate is:

$$W = \begin{bmatrix} \cos\frac{\delta}{2} - i\sin\frac{\delta}{2}\cos2\theta & -i\sin\frac{\delta}{2}\sin2\theta \\ -i\sin\frac{\delta}{2}\sin2\theta & \cos\frac{\delta}{2} + i\sin\frac{\delta}{2}\cos2\theta \end{bmatrix};$$

where δ represents a delay amount, θ represents an azimuth, and i is an integer factor.

The combination matrix C1 of the two quarter wave plates is:

$$C_1 = WW = \begin{bmatrix} \cos\delta - i\sin\delta\cos2\theta & -i\sin\delta\sin2\theta \\ -i\sin\delta\sin2\theta & \cos\delta + i\sin\delta\cos2\theta \end{bmatrix};$$

wherein the delay amount is related to the wavelength and angle of the incident light, only linearly-polarized light of a specific wavelength and angle is capable of maintaining the linearly-polarized state upon traveling through the two quarter wave plates, and most light with other wavelengths and angles deviates from the linearly-polarized state and forms a ghost image upon traveling through the polarization reflective film 235.

Figure 7:
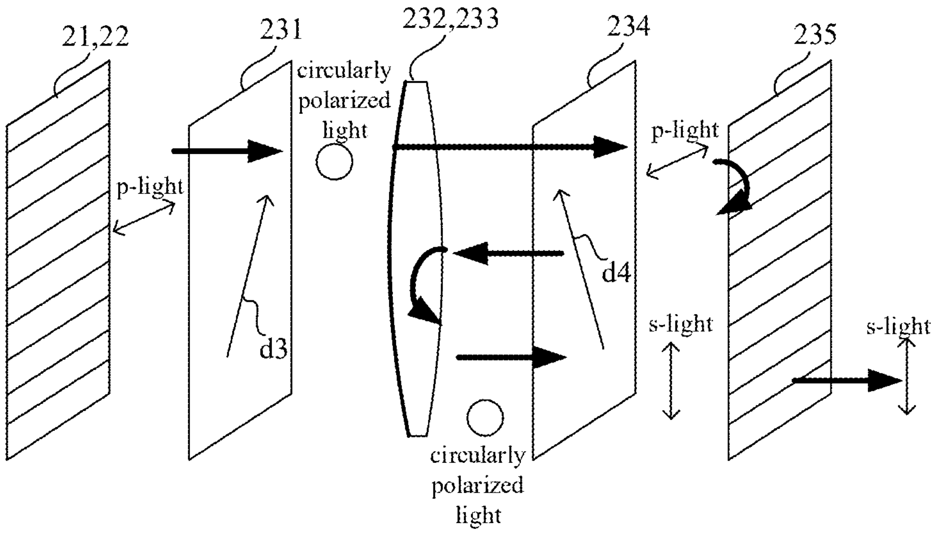
FIG. 7 is a schematic diagram of light corresponding to another display device according to some embodiments of the present disclosure.

Reference is made to FIG. 7, which is a schematic diagram of the light corresponding to another display device provided by the embodiments of the present disclosure, wherein the thicker arrows represent the direction of the light path. For the specific light path, reference is made to the corresponding illustration of FIG. 5, which is not repeated herein. The optical axes d3 and d4 of the two quarter wave plates 231 and 234 are perpendicular, the combination matrix C2 of the two quarter wave plates is:

$$C_2 = WW^* = \begin{bmatrix} 1 & 0 \\ 0 & 1 \end{bmatrix};$$

and as can be seen, the combination matrix is a unit matrix, i.e., the light of any polarization state can remain its polarization state upon traveling through the two quarter wave plates, which is independent of the angle as well as the wavelength of the light, therefore the likelihood of forming a ghost image is greatly reduced.

In some embodiments, the display panel includes a substrate, a display structure, and a cover plate that are stacked in sequence: wherein the micro-lens assembly is a structure formed by a photolithography process on a side, distal from the display structure, of the cover plate. Alternatively, the micro-lens assembly is affixed to the side, distal from the display structure, of the cover plate. In some embodiments, an adhesive layer is disposed on the cover plate of the display panel, and the micro-lens assembly is disposed on the adhesive layer, such that the micro-lens assembly is affixed to the side, distal from the display structure, of the cover plate.

In some embodiments, the display device provided by the embodiments of the present disclosure is a virtual reality display device. The ghosting phenomenon has a large impact on the display effect of the virtual reality display device, and the obvious ghosting phenomenon greatly reduces the viewing experience of the user. The display device provided by the embodiments of the present disclosure can effectively reduce the ghosting phenomenon and improve the user experience. In some embodiments, the display device provided by the embodiments of the present disclosure can decrease the contrast of ghost image by 10.7%, thereby effectively reducing the impact of ghost image on the display effect.

In summary, in the display device provided by the embodiments of the present disclosure, at least three micro-lens arrays are disposed at the side, away from the back surface, of the light-exiting surface of the display panel, and the at least three micro-lens arrays are arranged sequentially in a direction away from the center of the display region to respectively adjust the light exit angles of light beams emitted from a plurality of regions starting from the center of the display region, so as to reduce the light exit angles of the plurality of regions and make maximum light exit angles of the plurality of regions increase in a direction away from the center of the display region. In this way, ranges of light exit angles of the various regions of the display panel can be controlled, thereby solving the problem that the light exit angle of the light beam emitted by the display panel is difficult to control in the related art, which may lead to a poor imaging effect of the light beam projected by the lens assembly, achieving the control for the light exit angle of the light beam emitted by the display panel, and improving the display effect.

Figure 8:
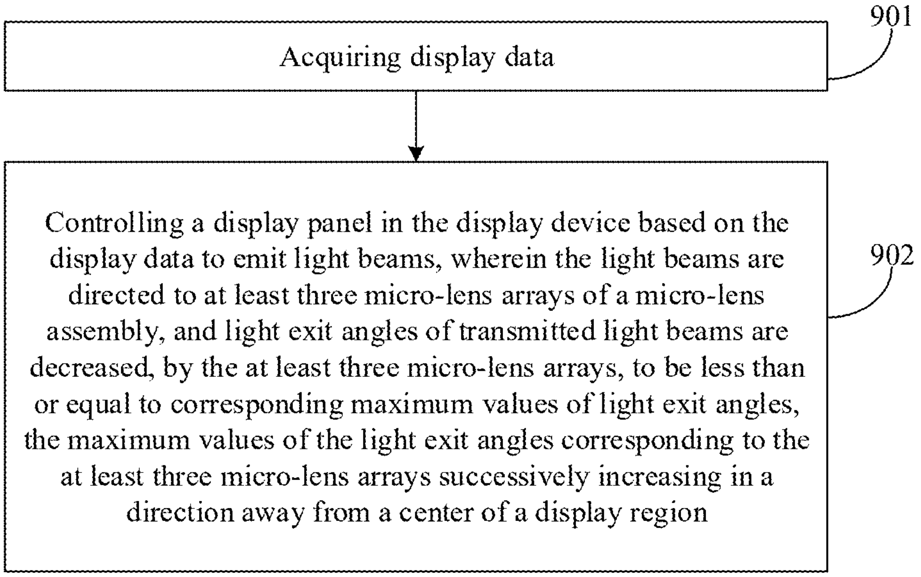
FIG. 8 is a method flowchart of a method for controlling a display device according to some embodiments of the present disclosure.

FIG. 8 is a method flowchart of a method for controlling a display device according to some embodiments of the present disclosure, which is applicable to any of the display devices provided by the above embodiments, and the method includes the following processes.

In process 901, display data is acquired.

In some embodiments, the display device further includes a control assembly. The control assembly is electrically connected to the display panel, and the control assembly acquires the display data from an external signal source or generates the display data locally.

In process 902, the display panel in the display device is controlled to emit light beams based on the display data, wherein the light beams are directed to the at least three micro-lens arrays of the micro-lens assembly, and light exit angles of transmitted light beams are decreased, by the at least three micro-lens arrays, to be less than or equal to corresponding maximum values of light exit angles, the maximum values of the light exit angles corresponding to the at least three micro-lens arrays successively increasing in a direction away from a center of a display region.

Referring to FIG. 2 above, the at least three micro-lens arrays 211 include a first micro-lens array a, a second micro-lens array b, and a third micro-lens array c. An orthographic projection of the first micro-lens array a on the display region q is within a first region q1 of the display region q, an orthographic projection of the second micro-lens array b on the display region q is within a second region q2 of the display region q, and an orthographic projection of the third micro-lens array c on the display region q is within a third region q3 of the display region q. The first region q1 is a region covering a center z of the display region q, the second region q2 is a region covering a middle position s of the display region q, and the third region q3 is a region covering an edge of the display region q, wherein the middle position s is an intermediate position between the center z of the display region q and the edge of the display region q.

In some embodiments, in the above process 902, adjusting the light exit angles of light beams by the at least three micro-lens arrays includes:

1) adjusting, by the first micro-lens array, a range of a maximum value of a light exit angle of a light beam traveling through the first micro-lens array to [8, 10];
2) adjusting, by the second micro-lens array, a range of a maximum value of a light exit angle of a light beam traveling through the second micro-lens array to (10, 14); and
3) adjusting, by the third micro-lens array, a range of a maximum value of a light exit angle of a light beam traveling through the third micro-lens array to [14, 16].

In summary, the method for controlling a display device provided by the embodiments of the present disclosure respectively adjusts the light exit angles of the light beams emitted from a plurality of regions starting from the center of the display region by at least three micro-lens arrays that are disposed at the side, away from the back surface, of the light-exiting surface of the display panel, to decrease the light exit angles of the plurality of regions and make the maximum light exit angles of the plurality of regions sequentially increase in a direction away from the center of the display region. In this way, the ranges of the light exit angles of the various regions of the display panel are controlled, thereby solving the problem that the light exit angle of the light beam emitted by the display panel in the related art is difficult to control, which may lead to a poor imaging effect of the light beam projected by the lens assembly, achieving the control for the light exit angle of the light beam emitted by the display panel, and improving the display effect.

It is noted that in the accompanying drawings, the dimensions of the layers and regions may be exaggerated for the sake of clarity of the illustrations. Moreover, it is understood that in the case that an element or a layer is referred to as being "on" another element or layer, the element or the layer is directly on the other element or there are intervening layers. Further, it can be understood that in the case that an element or a layer is referred to as being "under" another element or laver, it is directly under the other element, or there are one or more intermediate layers or elements. It is also understood that in the case that a layer or element is referred to as being "between" two layers or elements, the layer or element is the only layer between the two layers or elements, or there is more than one intermediate layer or element. Similar reference signs throughout the description indicate similar elements.

In the present disclosure, the terms "first," "second," and "third" are used only for descriptive purposes and are not to be understood as indicating or implying relative importance. The term "plurality" refers to two or more, unless otherwise expressly limited.

Described are merely some exemplary embodiments of the present disclosure, which are not intended to limit the present disclosure, and any modifications, equivalent substitutions, improvements, etc., made within the concepts and principles of the present disclosure shall be included in the scope of protection of the present disclosure.

The invention claimed is:

1. A display device, comprising: a display panel, a micro-lens assembly, and a lens assembly; wherein the display panel has a light-exiting surface and a back surface that are opposite to each other, the micro-lens assembly is disposed on a side, away from the back surface, of the light-exiting surface, and the lens assembly is disposed on a side, away from the display panel, of the micro-lens assembly;

wherein the micro-lens assembly comprises at least three micro-lens arrays; wherein orthographic projections of the at least three micro-lens arrays on a display region of the display panel are arranged sequentially in a direction away from a center of the display region, each of the at least three micro-lens arrays corresponds to a maximum value of a light exit angle, and each micro-lens array is configured to decrease a light exit angle of a light beam traveling through each micro-lens array, to make the light exit angle of the light beam traveling through each micro-lens array less than or equal to the maximum value of the corresponding light exit angle, the maximum values of the light exit angles corresponding to the at least three micro-lens arrays increasing sequentially in the direction away from the center of the display region; and the at least three micro-lens arrays comprise a first micro-lens array, a second micro-lens array, and a third micro-lens array;

wherein an orthographic projection of the first micro-lens array on the display region being within a first region of the display region, an orthographic projection of the second micro-lens array on the display region being within a second region of the display region, and an orthographic projection of the third micro-lens array on the display region being within a third region of the display region;

wherein the first region is a region covering the center of the display region, the second region is a region covering a middle position of the display region, and the third region is a region covering an edge of the display region, the middle position being an intermediate position between the center of the display region and the edge of the display region; and wherein an arch height of a micro-lens in the first micro-lens array ranges from 1.5 microns to 2.5 microns, a center distance between two adjacent micro-lenses in the first micro-lens array ranges from 2.5 microns to 3.5 microns, and a refractive index of a material of the micro-lens in the first micro-lens array ranges from 1.47 to 1.67;

an arch height of a micro-lens in the second micro-lens array ranges from 1.4 microns to 2.4 microns, a center distance between two adjacent micro-lenses in the second micro-lens array ranges from 2.5 microns to 3.5 microns, and a refractive index of a material of the micro-lens in the second micro-lens array ranges from 1.47 to 1.67; and an arch height of a micro-lens in the third micro-lens array ranges from 1.2 microns to 2.2 microns, a center distance between two adjacent micro-lenses in the third micro-lens array ranges from 2.5 microns to 3.5 microns, and a refractive index of a material of the micro-lens in the third micro-lens array ranges from 1.47 to 1.67.

2. The display device according to claim 1, wherein the display region is in a rectangular shape, both the second region and the third region are in a rectangular annular shape, and at least one edge of the second region is parallel to at least one edge of the third region.

3. The display device according to claim 1, wherein the orthographic projection of the third micro-lens array on the display region is overlapped with the edge of the display region.

4. The display device according to claim 1, wherein light exit angles of light beams traveling through the at least three micro-lens arrays increase in the direction away from the center of the display region.

5. The display device according to claim 1, wherein the display region comprises a plurality of sub-pixel regions arranged in an array; and each micro-lens array comprises a plurality of micro-lenses, wherein a region which an orthographic projection of the micro-lens on the display region is within covers at least one of the sub-pixel regions.

6. The display device according to claim 5, wherein the region which the orthographic projection of the micro-lens on the display region is within covers at least one pixel region, one pixel region comprising at least three sub-pixel regions.

7. The display device according to claim 1, wherein a range of a maximum value of a light exit angle corresponding to the first micro-lens array is [8, 10], a range of a maximum value of a light exit angle corresponding to the second micro-lens array is (10, 14), and a range of a maximum value of a light exit angle corresponding to the third micro-lens array is [14, 16].

8. The display device according to claim 1, wherein the lens assembly comprises a first quarter wave plate, a first lens, a second lens, a second quarter wave plate, and a polarization reflective film that are arranged sequentially in a direction away from each micro-lens array, wherein a semi-transparent and semi-reflective film is disposed on a side, facing towards the first quarter wave plate, of the first lens.

9. The display device according to claim 8, wherein optical axes of the first quarter wave plate and the second quarter wave plate are perpendicular.

10. The display device according to claim 1, wherein the display panel comprises a substrate, a display structure, and a cover plate that are stacked in sequence;

wherein the micro-lens assembly is a structure formed by a photolithographic process on a side, distal from the display structure, of the cover plate.

11. The display device according to claim 1, wherein the display device is a virtual reality display device.

12. The display device according to claim 1, wherein the display panel comprises a substrate, a display structure, and a cover plate that are stacked in sequence;

wherein the micro-lens assembly is affixed to a side, distal from the display structure, of the cover plate.

13. A method for controlling a display device, applicable to the display device, the method comprising:

acquiring display data; and controlling a display panel in the display device based on the display data to emit light beams, wherein the light beams are directed to at least three micro-lens arrays of a micro-lens assembly in the display device, and light exit angles of transmitted light beams are decreased, by the at least three micro-lens arrays, to be less than or equal to corresponding maximum values of light exit angles, the maximum values of the light exit angles corresponding to the at least three micro-lens arrays successively increasing in a direction away from a center of a display region of the display panel;

wherein the at least three micro-lens arrays comprise a first micro-lens array, a second micro-lens array, and a third micro-lens array, an orthographic projection of the first micro-lens array on the display region being within a first region of the display region, an orthographic projection of the second micro-lens array on the display region being within a second region of the display region, and an orthographic projection of the third micro-lens array on the display region being within a third region of the display region; wherein the first region is a region covering the center of the display region, the second region is a region covering a middle position of the display region, and the third region is a region covering an edge of the display region, the middle position being an intermediate position between the center of the display region and the edge of the display region; and wherein an arch height of a micro-lens in the first micro-lens array ranges from 1.5 microns to 2.5 microns, a center distance between two adjacent micro-lenses in the first micro-lens array ranges from 2.5 microns to 3.5 microns, and a refractive index of a material of the micro-lens in the first micro-lens array ranges from 1.47 to 1.67;

an arch height of a micro-lens in the second micro-lens array ranges from 1.4 microns to 2.4 microns, a center distance between two adjacent micro-lenses in the second micro-lens array ranges from 2.5 microns to 3.5 microns, and a refractive index of a material of the micro-lens in the second micro-lens array ranges from 1.47 to 1.67; and an arch height of a micro-lens in the third micro-lens array ranges from 1.2 microns to 2.2 microns, a center distance between two adjacent micro-lenses in the third micro-lens array ranges from 2.5 microns to 3.5 microns, and a refractive index of a material of the micro-lens in the third micro-lens array ranges from 1.47 to 1.67.

14. The method according to claim 13, wherein decreasing the light exit angles of the transmitted light beams by the at least three micro-lens arrays comprises:

adjusting, by the first micro-lens array, a range of a maximum value of a light exit angle of a light beam traveling through the first micro-lens array to [8, 10];

adjusting, by the second micro-lens array, a range of a maximum value of a light exit angle of a light beam traveling through the second micro-lens array to (10, 14); and adjusting, by the third micro-lens array, a range of a maximum value of a light exit angle of a light beam traveling through the third micro-lens array to [14, 16].

15. The method according to claim 13, wherein the display region is in a rectangular shape, both the second region and the third region are in a rectangular annular shape, and at least one edge of the second region is parallel to at least one edge of the third region.

16. The method according to claim 13, wherein the orthographic projection of the third micro-lens array on the display region is overlapped with the edge of the display region.

17. The method according to claim 13, wherein light exit angles of light beams traveling through the at least three micro-lens arrays increase in the direction away from the center of the display region.

18. The method according to claim 13, wherein the display region comprises a plurality of sub-pixel regions arranged in an array; and each micro-lens array comprises a plurality of micro-lenses, wherein a region which an orthographic projection of the micro-lens on the display region is within covers at least one of the sub-pixel regions.

19. The method according to claim 18, wherein the region which the orthographic projection of the micro-lens on the display region is within covers at least one pixel region, one pixel region comprising at least three sub-pixel regions.

* * * * *